(No Model.)
A. B. CALKINS.
ADJUSTABLE DIVIDING SCALE.
No. 458,967. Patented Sept. 1, 1891.
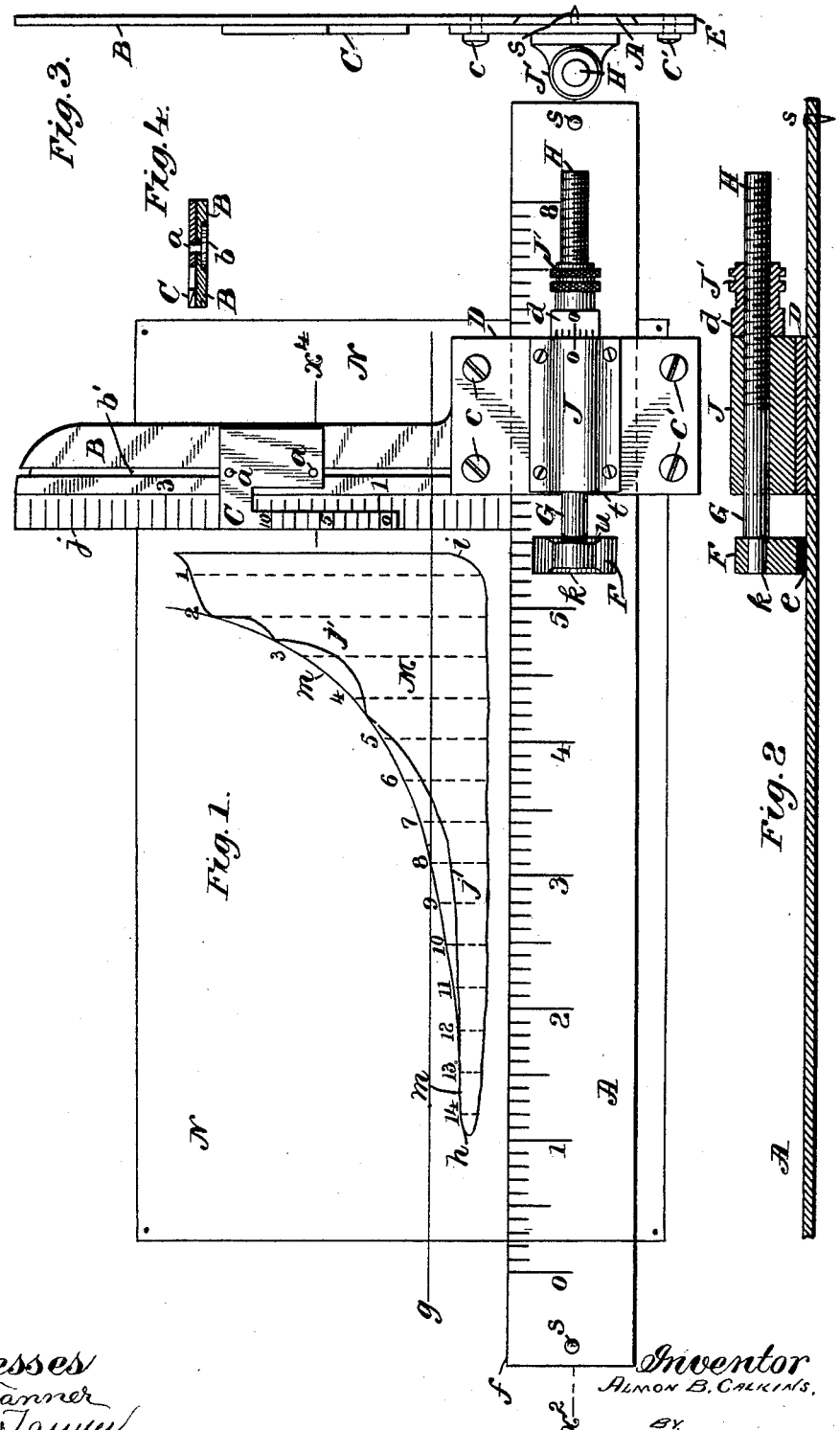
Witnesses
Wm J Tanner
A. J. Tanner
Inventor
Almon B. Calkins,
By
Geo. O. Phillips.

UNITED STATES PATENT OFFICE.

ALMON B. CALKINS, OF NEW YORK, N. Y., ASSIGNOR OF ONE-HALF TO FERRAL C. DININNY, JR., OF SAME PLACE.

ADJUSTABLE DIVIDING-SCALE.

SPECIFICATION forming part of Letters Patent No. 458,967, dated September 1, 1891.

Application filed February 26, 1891. Serial No. 382,919. (No model.)

*To all whom it may concern:*

Be it known that I, ALMON B. CALKINS, a citizen of the United States, residing at New York, in the county of New York and State of New York, have invented certain new and useful Improvements in Adjustable Dividing-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an adjustable dividing-scale, its object being to subdivide any irregular plan, figure, or diagram in order to accurately determine the position of the ordinates in such figure; and to establish the proper distance of one ordinate from the other; also to erect them perpendicular with the base of the figure or diagram. It is particularly applicable in determining the areas of steam-engine indicator-diagrams by locating the position of the ordinates and abscissas of the hyperbolic curve. It is also useful in subdividing any line or plan figure within its scope.

My invention consists of a graduated horizontal beam, combined with a graduated upright mounted thereon and at right angles thereto, said upright arranged to be moved along the face of the horizontal beam, also an adjustable vernier attachment connected with the upright, so that by means of said attachment the graduations on the upright may be subdivided into still finer parts, giving thereby the exact height of each ordinate, combined with a micrometer attachment on the horizontal beam, whereby the exact width of the ordinates may be obtained.

In order to enable others to understand and use my said invention, I will proceed to describe the construction and operation of the device whereby I obtain the above results, and subsequently point out in the appended claims such characteristic features as I believe to be novel.

Referring to the accompanying drawings, Figure 1 represents a plan view of the dividing-scale placed over a steam-engine indicator-card. Fig. 2 is a sectional side elevation through line $x^2$ of Fig. 1. Fig. 3 is a rear end elevation of Fig. 1. Fig. 4 is a section through the line $x^4$, Fig. 1.

Its construction and operation are as follows:

A represents the graduated scale-beam; B, the graduated upright, and C the vernier-slide thereon and adjustably secured thereto by rivets $a$, having heads $b$, which heads move in the slot $b'$ of the upright.

D is a plate overlying beam A, one end of which plate is secured to the upright B by means of the screws $c$, while the other end of said plate is attached to gib $e$ by means of the screws $c'$.

F is a set-edge arranged to be adjusted along the graduated face of beam A to establish the different positions required thereon for the upright B.

G is a set-edge rod, H its threaded end, and J a support attached to plate D for the rod G, said rod having a free longitudinal movement therein.

J' is a threaded micrometer-nut, having the graduated face $d$. Said nut is mounted on the threaded end H of the rod G.

$e$ is a rubber pad placed between the face of beam A and the under side of set-edge F.

$f$ is the upper edge of beam A, and represents the vacuum-line when used in conjunction with an indicator-diagram. $g$ is the atmosphere-line.

A practical application of the instrument to an irregular figure is shown in Fig. 1, the indicator-diagram M, which is from a non-condensing engine, being the subject for division and subsequent calculation for area with its mean height. The instrument is placed over the diagram M and held firmly in such position by the pins $s$, which are located in each end of the beam A. The first operation will be to determine the length of the diagram. This is done (see Fig. 1) by moving the upright B to the point $h$. Then move upright B back to the point $i$ at the extreme right of the diagram, and note this point also on the horizontal scale. We find in this case that the full length of the diagram is 4.690 inches.

We will now proceed with the operation by dividing the diagram into fourteen equal parts. This will make the distance between each ordinate .335 inch. It will be found more convenient in laying out irregular figures to locate the first and last ordinates at a distance from each end of the diagram equal to one-half of the ordinate space. This obviates the necessity of adding the first and last ordinates together and dividing them by two. This distance from each end of the diagram to the extreme ordinates equals .1675 inch, or one-half of the ordinate. Therefore from the end $i$, a distance equal to .1675, we lay off the first ordinate 1 in the following manner: Bring the edge $j$ of the upright to the line $i$ of the diagram M, push the rod G back until the set-edge F strikes the housing or support J. This will bring the edge $k$ of the set-edge on a line with the edge $j$ of the upright B. Then unscrew the nut J' and push forward the set-edge F along the horizontal scale on beam A one-tenth of an inch. The remaining .0675 can be obtained by means of the micrometer-scale $d$ or nut $g'$. Push forward rod G the distance (.0675) that the micrometer-nut has given, which will bring the edge $k$ of set-edge F in the position required for first the ordinate. To continue the operation, place the finger on the set-edge F and bring the upright B forward until its edge $j$ coincides with or is on a line with the edge $k$ of set-edge F. Then draw the first ordinate 1 along edge $j$ of upright B. The second line being a full ordinate, place the edge $j$ of upright B on any mark on the horizontal scale and move set-edge F forward three-tenths of an inch. The remaining thirty-five hundredths can be obtained by means of the micrometer-nut J'. Push rod G forward until nut J' strikes the support J. Then move upright B forward until the edge $t$ of said support meets the edge $u$ of set-edge F. This operation will bring edges $j$ of upright B and $k$ of support J on a line, as before mentioned. From this position the second ordinate 2 is projected in the same manner as the first. There has now been set off on rod G the distance of a full ordinate, and the remaining ordinates can be projected in the same manner as above described—viz., by simply moving rod G to the left as far as nut J' will permit. Then press the finger on set-edge F and bring forward upright B against said set-edge and project the ordinate. Continue this operation until all of the fourteen ordinates have been drawn. To determine the area of the diagram, slide the upright B back to the first ordinate, and note height of the same in tenths on upright scale B and in hundredths by means of the vernier-slide C thereon. Each ordinate, having thus been separately measured and their sum divided by the number of ordinates and the quotient multiplied by the length of the diagram, will give the area, and also the two sides, length, and breadth in inches.

To apply this instrument in forming the hyperbolic curve about the actual curve, first locate the line $g$ at a point above the top edge $f$ of beam A, which distance will represent the full pressure of the atmosphere, and this line $g$ is characterized as the position of the perfect vacuum-line and from which all calculations are made in getting the length of the ordinates of the hyperbolic curve. Take the ordinates already drawn, as hereinbefore mentioned, and elongate or shorten as their length becomes apparent. For this purpose it has been found by practical operation better to start at a position in the actual curve just before the point of exhaustion. In the drawings this point appears on the thirteenth ordinate. The actual pressure in pounds per square inch at the point above mentioned is as the length of said ordinate in twenty-fourths of inches. Therefore by sliding upright B forward to the thirteenth ordinate its length can be taken on the upright scale in hundredths, being an equal equivalent for twenty-fourths. A multiplication of this amount in hundredths by its position from the first ordinate in hundredths will be the length of the first ordinate. In obedience to the law that inversely as the space increases the pressure decreases, the second ordinate will be one-half the length of the first and the third ordinate one-third the length of the first, and so on through the whole number of ordinates, dividing the first by the number of ordinates from it. As each ordinate is calculated in its length, the upright B is moved along beam A until its edge $j$ coincides with such ordinate and the distance from zero pricked thereon in hundredths, and so on for each succeeding ordinate. Through these points on the ordinates the true hyperbolic curve $m$ may be drawn, and the difference in the two curves $j'$ and $m$ will give the clue whereby improvements in the action of the steam are projected.

This instrument is capable from its construction to divide a figure to the finest degree and measure the same with minuteness unattained, except with scales divided by hundredths.

In laying out the hyperbolic curve it facilitates great accuracy on account of the numerous divisions that can be made, the method of applying it to lay out the hyperbolic curve being the same as in the parallel rule, with the exception that no correction is necessary in reducing to hundredths. The equivalent of any scale can be shown by this device and more accurately than by any ordinary method.

Having thus described my invention, what I claim as new, and wish to secure by Letters Patent, is—

1. In an adjustable dividing-scale for measuring and subdividing plan figures or diagrams, the combination, with a graduated horizontal beam, of an upright mounted thereon and at right angles therewith, said upright carrying a rod having on one end thereof a set-edge to engage with the graduated face of the horizontal beam, the other end threaded and carrying a micrometer-nut, said set-edge and upright arranged to be moved along the face of the horizontal beam independent of each other or together, as set forth.

2. In an adjustable dividing-scale for measuring and subdividing plan figures or diagrams, the combination, with a graduated horizontal beam, of a graduated upright mounted on such beam and placed at right angles therewith and arranged to be moved thereon, said upright having a vernier-slide thereon, by means of which slide the graduations on the upright may be subdivided into still finer parts, said upright carrying a set-edge, which set-edge engages with the graduated face of the horizontal beam, said set-edge and upright arranged to be moved independent of each other, means, substantially as shown, whereby the movement or travel of each is limited by the other, and a micrometer-nut connected with such set-edge to subdivide the graduations of the horizontal beam into finer parts, substantially as set forth.

3. In an adjustable dividing-scale for measuring and subdividing plan figures or diagrams, the combination, with the horizontal beam A and upright B, mounted on such beam and arranged to be moved along the same, of the set-edge F, overlying the beam A and engaging with the graduations thereon, said set-edge having rod G, which rod is mounted in the support J of the upright, having a free longitudinal movement therein, said set-edge rod having the threaded end H, micrometer-nut J', mounted on such threaded end, which nut limits the travel of the set-edge in its forward movement, the forward movement of the upright being checked by the set-edge when such set-edge is held firmly to the graduated face of the horizontal beam, substantially as set forth.

In testimony whereof I affix my signature in presence of two witnesses.

ALMON B. CALKINS.

Witnesses:
WILLIAM MOLLOY,
CHAS. A. RILEY.